(12) United States Patent
Min et al.

(10) Patent No.: US 12,423,461 B1
(45) Date of Patent: Sep. 23, 2025

(54) DATA PROTECTION UTILIZING EFFICIENT DATA CLASSIFICATION

(71) Applicant: International Business Machines Corporation, Armonk, NY (US)

(72) Inventors: Hong Min, Hopewell Junction, NY (US); Sahil Dureja, Calgary (CA); Venkat K. Balagurusamy, Airmont, NY (US); Eysha Shirrine Powers, Los Angeles, CA (US); Cecilia Carranza Lewis, San Jose, CA (US); Gayathiri Chandran, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 60 days.

(21) Appl. No.: 18/609,237

(22) Filed: Mar. 19, 2024

(51) Int. Cl.
*G06F 16/28* (2019.01)
*G06F 21/62* (2013.01)

(52) U.S. Cl.
CPC ........ *G06F 21/6227* (2013.01); *G06F 16/285* (2019.01)

(58) Field of Classification Search
None
See application file for complete search history.

(56) References Cited

U.S. PATENT DOCUMENTS

| | | | |
|---|---|---|---|
| 9,015,812 B2 | 4/2015 | Plattner | |
| 9,762,603 B2 | 9/2017 | Grondin | |
| 2021/0056219 A1 | 2/2021 | Sofer | |
| 2023/0306003 A1* | 9/2023 | Jain | G06F 16/254 |

FOREIGN PATENT DOCUMENTS

| | | |
|---|---|---|
| CN | 110110756 A | 8/2019 |
| JP | 2020194355 A | 12/2020 |

OTHER PUBLICATIONS

"Method of Automatic Management of Containerized Workload Based on Sensitivity Classification," Sep. 18, 2020, 5 pages, IPCOM000264448D, IP.com.

(Continued)

*Primary Examiner* — Cai Y Chen
(74) *Attorney, Agent, or Firm* — CANTOR COLBURN LLP; Randy Emilio Tejeda

(57) ABSTRACT

A technique of data classification and data protection includes recording, in a lineage repository, dependence relationships between data objects and recording, in a classification repository, data classifications applicable to data objects. The data classifications each indicate a respective class of sensitive data to which data protection is to be applied. Based on receiving a classification job requesting classification of a first data object, a processor determines whether the lineage repository records a dependence relationship with a second data object. Based on determining that the lineage repository records a dependence relationship with the second data object, the processor associates in the classification repository at least a particular data classification applicable to the second data object with the first data object. The processor applies data protection applicable to the particular data classification to the first data object. In some cases, the processor may order application of classification models based on cost metrics.

18 Claims, 4 Drawing Sheets

(56) References Cited

OTHER PUBLICATIONS

"Self-Learning Method to Predict a Workload Indicator for Provisioning of Resources," IPCOM000158172D, Sep. 18, 2007, 11 pages, IP.com.
Feng, S., "A Cost-Sensitive Decision Tree Under the Condition of Multiple Classes," International Conference on Logistics Engineering, Management and Computer Science (LEMCS 205), 2015, 7 pages.
Ling, C. et al., "Cost-Sensitive Learning and the Class Imbalance Problem," 2008, 8 pages, Encyclopedia of Machine Learning, Springer.

\* cited by examiner

DATA PROTECTION UTILIZING EFFICIENT DATA CLASSIFICATION

BACKGROUND OF THE INVENTION

The present invention relates in general to data processing, and more specifically, to techniques for data protection in data processing systems. Still more particularly, the present invention relates to techniques for data protection in which different levels of data protection are applied to various datasets based on data classifications determined at least in part on data lineage.

In the era of so-called "big data," corporate, educational, and governmental organizations increasingly manage, store, process, and transmit enormous amounts of data. Pursuant to various legal requirements, terms of service and other contractual obligations, and internal data management policies applicable to the data, various different data handled by an organization may have different associated data protection requirements. These data protection requirements can include, for example, data access restrictions, data storage resiliency requirements, access response time requirements, data homing (i.e., geographical storage) restrictions, data encryption requirements, and the like. To appropriately apply the data protection requirements to the different data, the data is classified into different data classifications.

SUMMARY OF THE INVENTION

The present application recognizes that the implementation of data protection compliant with the various applicable legal requirements, contractual obligations, and data management policies often entails data classification, which is defined herein as the assignment of data to one of a plurality of different data classes to which differing data protection requirements are applicable.

Data classification has at least two associated concerns: classification accuracy and classification cost. Classification accuracy refers to the association of each datum with the correct data class. Classification accuracy thus ensures that each datum is handled appropriately in accordance with the data protection requirements. For example, classification accuracy may ensure that confidential personal information, such as payment card numbers, banking information, and the like, is only persistently stored in encrypted form and that non-confidential public information, such as legal statutes, is stored in unencrypted form. Classification accuracy is generally enhanced if data classification is performed utilizing a greater number of different classification models, which can be useful even if the classification models have some similarity or discover overlapping data classifications. Thus, lower classification accuracy would be expected if data classification were performed with a fewer number of classification models, and greater classification accuracy would be expected if data classification were performed with a greater number of classification models.

As will be appreciated, in the prior art, there is generally an inverse relationship between classification accuracy and classification cost, which can be quantified, for example, in terms of one or more of processor (CPU) cycles, memory use, communication bandwidth, and power consumption. The present application appreciates that it would be useful and desirable to improve data protection by, among other ways, preserving classification accuracy while reducing classification cost.

In at least one embodiment, a technique of data classification and data protection includes recording, in a lineage repository, dependence relationships between data objects and recording, in a classification repository, data classifications applicable to data objects. The data classifications each indicate a respective class of sensitive data to which data protection is to be applied. Based on receiving a classification job requesting classification of a first data object, a processor determines whether the lineage repository records a dependence relationship with a second data object. Based on determining that the lineage repository records a dependence relationship with the second data object, the processor associates in the classification repository at least a particular data classification applicable to the second data object with the first data object. The processor applies data protection applicable to the particular data classification to the first data object.

Figure 1:
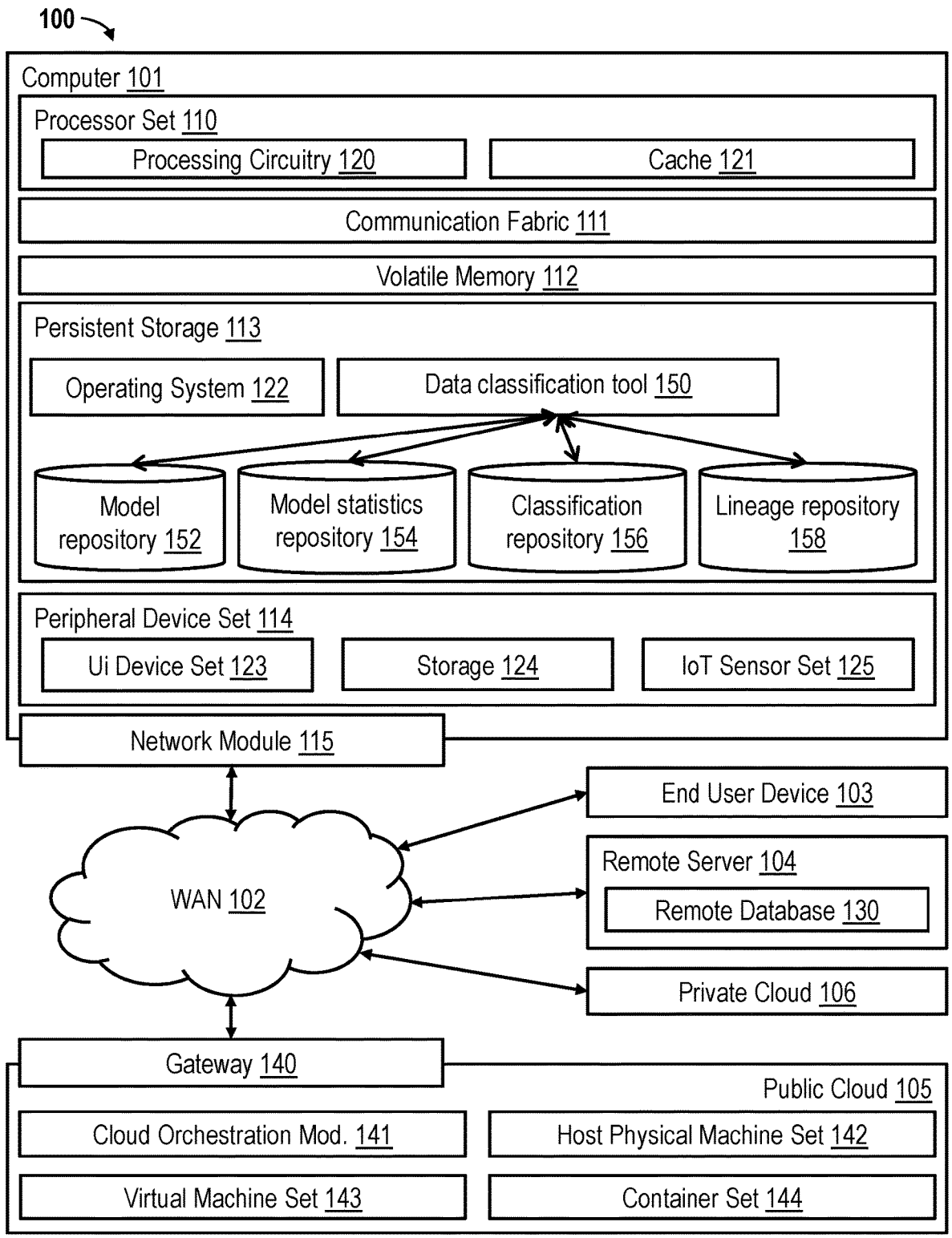
FIG. 1 is a high-level block diagram of an exemplary data processing environment in accordance with one or more embodiments.

In accordance with common practice, various features illustrated in the drawings may not be drawn to scale. Accordingly, dimensions of the various features may be arbitrarily expanded or reduced for clarity. In addition, some of the drawings may not depict all of the components of a given system, method, or device. Finally, like reference numerals may be used to denote like or corresponding features in the specification and figures.

DETAILED DESCRIPTION OF ILLUSTRATIVE EMBODIMENT

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data classification tool 150, which has a number of associated databases, including model repository 152, model statistics repository 154, classification repository 156, and lineage repository 158. In addition to classification tool 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and data classification tool 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one or more computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods may be implemented in data classification tool 150 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet-of-Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the Internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the Internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Those of ordinary skill in the art will appreciate that the architecture and components of a data processing environment can vary between embodiments. Accordingly, the exemplary computing environment 100 given in FIG. 1 is not meant to imply architectural limitations with respect to the claimed invention.

Figure 2:
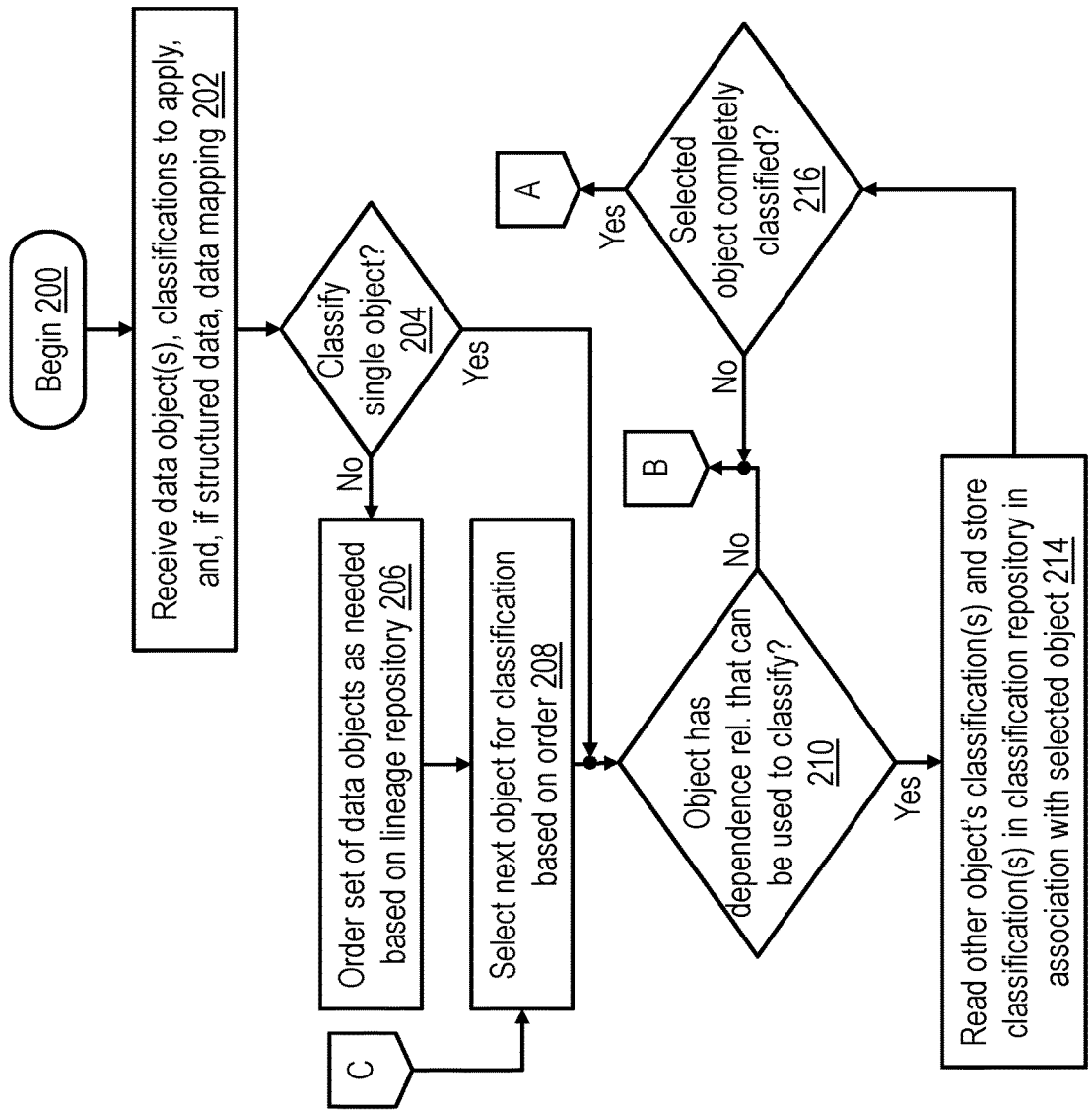
FIGS. 2-3 together form a high-level logical flowchart of an exemplary method of data classification in accordance with one or more embodiments.
Figure 3:
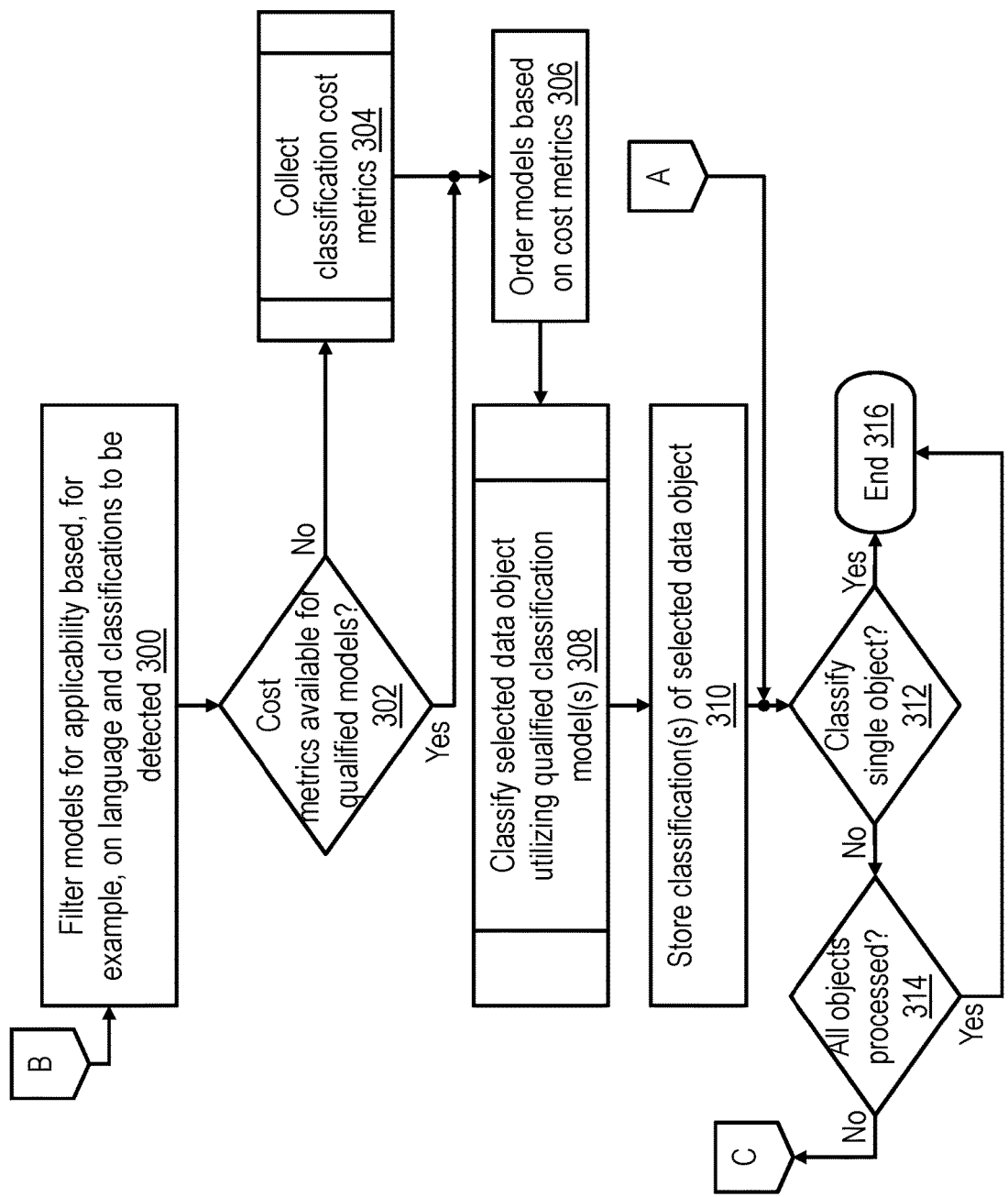

Referring now to FIGS. 2-3, there is depicted a high-level logical flowchart of an exemplary method of data classification in accordance with one or more embodiments. In at least some embodiments, the illustrated method is performed by processing circuitry 120 of computer 101 through execution of data classification tool 150.

The process begins at block 200 of FIG. 2 and then proceeds to block 202, which depicts data classification tool 150 receiving a classification job identifying one or more data objects to be classified to detect presence, if any, of sensitive data within the data object(s). The data object(s), which may be, for example, document(s), log file(s), text file(s), audio file(s), video file(s), database(s), and the like, may include both unstructured and structured data. In addition to the data object(s), data classification tool 150 can receive additional input parameters, including one or more classifications of sensitive data to be detected within the data object(s), and if the data object(s) include structured data, data mapping associating elements of the structured data (e.g., database columns) with particular classifications of sensitive data. The classifications of sensitive data can be any classes of data to which data protection can be applied and can include, for example, personal health information (PHI), biometric data, financial information, intellectual property information, payment and banking information, personally identifying information, confidential information, login credentials, location information, certain audio, graphics, image and/or video content, etc.

The process proceeds from block 202 to block 204, which illustrates data classification tool 150 determining whether the classification job is for a single data object or for a set of multiple data objects. In response to data classification tool 150 determining at block 204 that the classification job is for classification of a single data object, the process proceeds from block 204 to block 210, which is described below. In response to a data classification tool 150 determining at block 204 that the classification job is instead for classification of a set of multiple data objects, the process proceeds to block 206.

Block 206 illustrates data classification tool 150 ordering data objects within the set of data objects for processing based on dependence relationships recorded in lineage repository 158. For example, lineage repository 158 may define a dependence relationship between a pair of data objects including a source data object and a target data object derived from the source data object. The dependence relationship can arise based on a variety of different relationships between the source data object and target data object. For example, a dependence relationship can arise based on, among other relationships, the target data object including data copied from the source data object, the target data object being created by a file system rename or move of the source data object, and/or the target object including a log of processing performed on the source data object.

In some embodiments, each dependence relationship defined in lineage repository 158 is a one-way (unidirectional) target-to-source dependence relationship, meaning that classification of the target data object as containing one or more classes of sensitive data necessarily means that the source data object having a dependence relationship with the target data object also is considered to contain the same class(es) of sensitive data. In a unidirectional target-to-source dependence relationship, classification of the source data object as containing a sensitive data implies nothing regarding whether the target data object contains sensitive data. In other embodiments, data classification tool 150 additionally supports definition of two-way (bidirectional) dependence relationships for selected pairs of data objects. In a bidirectional dependence relationship, classification of either a source data object or target data object as containing sensitive data of a particular class implies that the other contains sensitive data of the same class. In at least some embodiments, data classification tool 150 builds lineage repository 158 based on user input and/or automatically based on reporting of file system operations and other data object processing operations that create object dependencies and/or automatically through execution of tools that perform application discovery.

In the processing performed at block 206, data classification tool 150 preferably orders the data objects in the set of data objects for processing such that any data objects having a unidirectional dependence relationship with another data object are classified by data classification tool 150 in advance of any data objects whose classification(s) they depend on. Thus, for example, given a source data object and a target data object defined by lineage repository 158 as having a one-way (unidirectional) target-to-source dependence relationship, the target data object is preferably ordered to be processed prior to the source data object. As will be appreciated, data objects having a bidirectional dependence relationship need not be ordered relative to one another at block 206.

At block 208, data classification tool 150 selects the next data object to be classified from the ordered set of data objects established at block 206. Data classification tool 150 then determines whether or not lineage repository 158 defines a dependence relationship for the selected data object that can be utilized to classify the selected data object in at least one of the classifications specified in the input parameters received at block 202. In response to a negative determination at block 210, the process passes through page connector B to block 300 of FIG. 3, which is described below. However, in response to an affirmative determination at block 210, the process proceeds to block 214. Block 214 illustrates data classification tool 150 reading, from classification repository 156, the classification(s) of the other object in the dependence relationship with the selected object and storing those classification(s) in classification repository 156 in association with the selected data object.

In some cases, reference to lineage repository 158 enables data classification tool 150 to completely classify the selected data object as containing or not containing sensitive data in accordance with each of the classifications specified at block 202. In other cases, data classification tool 150 can classify the selected data object in accordance with a subset of, but not all of, the classifications to be applied. As indicated at block 216, in response to data classification tool 150 determining that the dependence relationships defined by lineage repository 158 enable complete classification of the selected data object, the data classification process passes through page connector A to block 320 of FIG. 3, which is described below. In response to data classification tool 150 determining that the dependence relationships defined by lineage repository 158 do not enable complete classification of the selected data object in accordance with all of the classifications specified at block 202, the data classification process passes through page connector B to block 300 of FIG. 3, which is now described.

Referring now to block 300 of FIG. 3, data classification tool 150 filters the classification models stored in model repository 152 for applicability to the classification job based on, for example, the classifications of sensitive data to be detected as specified at block 202, one or more human languages, and/or the presence or absence of structured data in the selected data object. In addition, at block 300, data classification tool 150 eliminates use of any classification models exclusively utilized to detect class(es) of sensitive data already detected by reference to the lineage analysis performed at blocks 210 and 214 of FIG. 2. Once a subset of the available classification models has been qualified for use at block 300, data classification tool 150 determines at block 302 whether or not cost metrics for the qualified classification models are available, for example, in model statistics repository 154. Model statistics repository 154 can report the cost metrics, for example, in terms of one or more of processing cycles, processing time, qubits, power consumption, communication bandwidth, and/or memory footprint, and/or other units of cost.

In response to data classification tool 150 determining at block 302 that model repository 152 contains cost metrics for each qualified classification model, the process proceeds directly to block 306, which is described below. In response to data collection tool 150 alternatively determining at block 302 that cost metrics are not available in model statistics repository 154 for all qualified classification models to be utilized to detect presence of sensitive data in the selected data object, data classification tool 150 collects such classification cost metrics for each qualified classification model lacking such cost metrics and records them in model statistics repository 154 (block 304).

Figure 4:
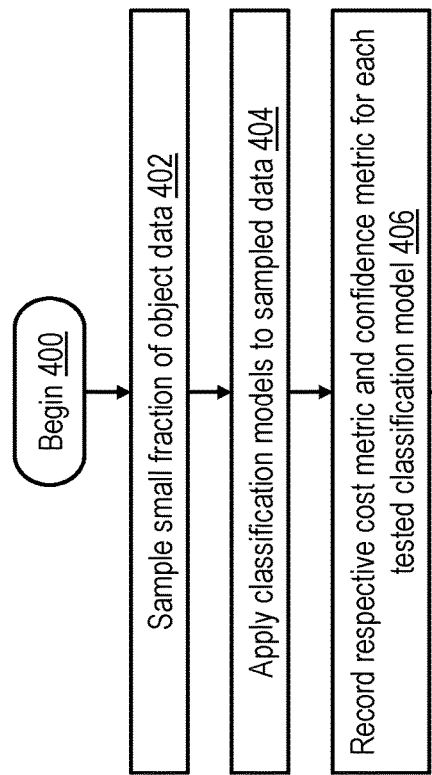
FIG. 4 is a high-level logical flowchart of an exemplary method of collecting classification cost metrics for various classification models in accordance with one or more embodiments.

Referring now to FIG. 4, there is depicted a high-level logical flowchart of an exemplary method of collecting classification cost metrics for various classification models in accordance with one or more embodiments. In the depicted embodiment, the method of collecting classification cost metrics begins at block 400 and then passes to block 402, which depicts data classification tool 150 sampling a small fraction of the data of the selected data object. The sample taken by data collection tool 150 at block 402 is preferably selected to be representative of the data present within the selected data object.

At block 404, data classification tool 150 applies each of the qualified classification models lacking associated cost metrics in model statistics repository 154 to the data sampled at block 402. In some cases, each of the classification models detects a respective different one of a plurality of classifications of sensitive data; in other cases, at least two of the classification models applied to the sampled data, while differing from one another, are configured to detect sensitive data of the same classification (e.g., PHI or payment information). Thus, different classification models may be utilized to detect sensitive data of the same classification utilizing differing techniques (e.g., data formatting, string matching, pattern matching, rules-based matching, etc.). Data classification tool 150 then records, within model statistic repository 154, a respective cost metric, and optionally, a confidence metric, for each tested classification model (block 406). As noted above, the cost metrics can be reported, for example, in terms of one or more of processing cycles, processing time, qubits, power consumption, communication bandwidth, and/or memory footprint, and/or other cost units. The confidence metric can provide, for example, a numeric value indicating a confidence in the cost metric. The confidence metric can be based, for example, on the size of the data sample taken at block 402 relative to the size of the data object and the historic classification accuracy of the classification model in accurately detecting sensitive data. Processing thereafter returns via block 408 to block 306 of FIG. 3.

At block 306 of FIG. 3, data classification tool 150 orders the qualified classification models for application to the selected data object based on the associated cost metrics in model statistic repository 154. For example, in at least some embodiments, data classification tool 150 orders classification models having lower associated cost metrics in advance of those having higher associated cost metrics. Data classification tool 150 then classifies the selected data object as containing or not containing sensitive data by processing the data of the data object with the qualified classification model(s) (block 308), as discussed in greater detail below with reference to FIG. 5. Following processing of the object data with the qualified classification models, data classification tool 150 stores in classification repository 156 the classification(s) of sensitive data, if any, applicable to the selected data object (block 310).

The process proceeds from block 310 to blocks 312-314, which together represent data classification tool 150 determining whether or not the processing of all data objects to be classified in the classification job is complete, that is, whether the classification job included only a single data object or whether all of multiple data objects in the classification job have been processed In response to data classification tool 150 determining that processing of all data objects to be classified by the classification job is not complete, the process returns to block 208 of FIG. 2 through page connector C. If, however, data classification tool 150 determines that processing of all data objects to be classified by the classification job is complete, the data classification process of FIGS. 2-3 ends at block 316 of FIG. 3.

Figure 5:
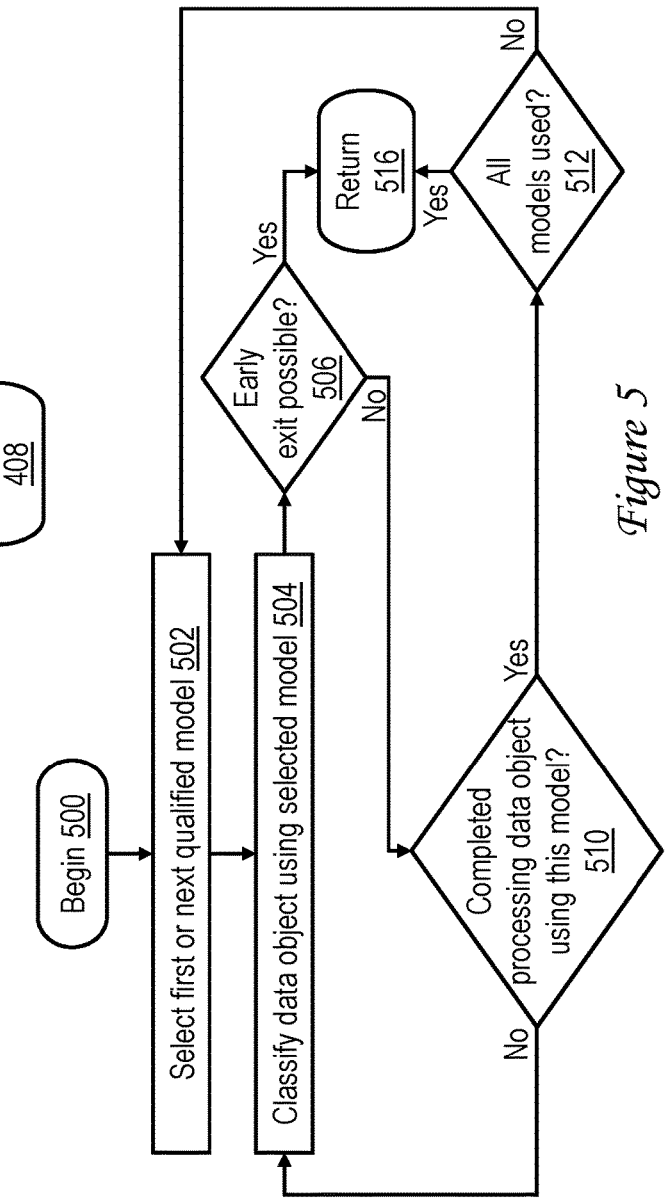
FIG. 5 is a high-level logical flowchart of an exemplary method of processing a selected data object utilizing one or more classification models in accordance with one or more embodiments.

With reference now to FIG. 5, there is illustrated a high-level logical flowchart of an exemplary method of processing a selected data object utilizing one or more classification models in accordance with one or more embodiments. The method of FIG. 5 can be performed by data classification tool 150, for example, at block 308 of FIG. 3.

The method of FIG. 5 begins at block 500 and then proceeds to block 502, which illustrates data classification tool 150 selecting a first qualified classification model from the list of data classification models developed at block 300 of FIG. 3. Data classification tool 150 then processes the data of the selected data object utilizing the selected classification model to detect the presence, if any, of sensitive data in the data object (block 504). As will be appreciated, the technique employed within the classification model to detect the presence of the sensitive data will depend upon, among other things, the class of data to be detected.

During the processing of the data object, data classification tool 150 monitors the progress of the detection for the sensitive data utilizing the selected classification model to determine whether or not it is possible to exit processing utilizing the current classification model prior to processing all of the data of the selected data object (block 506). For example, if the selected data object being processed contains structured data, such as a table, data classification tool 150 can be configured to determine to exit classification processing early based on detection of sensitive data of a particular classification in a predetermined percent of the table rows. Similarly, if the data of the selected data object being processed is unstructured, data classification tool 150 can be configured to exit classification processing early based on detecting all classifications of sensitive data to be detected at least once in the selected data object (or in some cases, the set of data objects). In response to a determination at block 506 that early exit is possible, the process returns through block 514 to block 310 of FIG. 3. If, however, data classification tool 150 determines at block 506 that early exit is not yet possible, data classification tool 150 detects whether processing of the selected data object utilizing the current classification model is complete (block 510). If not, data classification tool 150 continues classification processing utilizing the current classification model, as indicated by the process returning to block 504. If, however, data classification tool 150 detects at block 510 that processing of the selected data object utilizing the current classification model is complete, data classification tool 150 further determines whether or not all qualified classification models have be used to process the data object to detect the presence of sensitive data (block 512). In response to a negative determination at block 512, the process of FIG. 5 returns to block 502, which has been described. If, however, data classification tool 150 determines that all qualified classification models have be used to process the data object to detect the presence of sensitive data, the process passes to block 516 and returns to block 310 of FIG. 3, which has been described.

Based on the detection of the presence and/or absence of sensitive data within the data object or set of data objects upon which classification job is performed, data classification tool 150 or other program code within computer 101 or computing environment 100 implements an appropriate level of data protection based on the classification(s), if any, of sensitive data present in the data object or set of data objects. This data protection can include, for example, encrypting one or more data objects, increasing and/or decreasing access protections applicable to the data object(s) (e.g., mandating multifactor authentication), changing a storage location of the data object(s) (e.g., moving the data object(s) on-platform or off-platform or homing the data object(s) within a particular geographic or legal boundary), implementing a different level of access logging for the data object(s) (e.g., for PHI), etc.

As has been described, in at least one embodiment, data protection is enhanced by efficiently classifying data objects containing sensitive data. In some embodiments or use cases, classification efficiency is enhanced by classifying data objects based on data lineage and/or based on the relative costs of applicable classification models.

In at least one embodiment, a technique of data classification and data protection includes recording, in a lineage repository, dependence relationships between data objects and recording, in a classification repository, data classifications applicable to data objects. The data classifications each indicate a respective class of sensitive data to which data protection is to be applied. Based on receiving a classification job requesting classification of a first data object, a processor determines whether the lineage repository records a dependence relationship with a second data object. Based on determining that the lineage repository records a dependence relationship with the second data object, the processor associates in the classification repository at least a particular data classification applicable to the second data object with the first data object. The processor applies data protection applicable to the particular data classification to the first data object.

The present invention may be implemented as a method, a system, and/or a computer program product. The computer program product may include a storage device having computer-readable program instructions (program code) thereon for causing a processor to carry out aspects of the present invention. As employed herein, a "storage device" is specifically defined to include only statutory articles of manufacture and to exclude signal media per se, transitory propagating signals per se, and energy per se.

Aspects of the present invention are described herein with reference to flowchart illustrations and/or block diagrams that illustrate the architecture, functionality, and operation of possible implementations of systems, methods, and computer program products according to various embodiments. It will be understood that each block of the block diagrams and/or flowcharts and combinations of blocks in the block diagrams and/or flowcharts can be implemented by special purpose hardware-based systems and/or program code that perform the specified functions. While the present invention has been particularly shown as described with reference to one or more preferred embodiments, it will be understood by those skilled in the art that various changes in form and detail may be made therein without departing from the spirit and scope of the invention.

The figures described above and the written description of specific structures and functions are not presented to limit the scope of what Applicants have invented or the scope of the appended claims. Rather, the figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms and that multiple of the disclosed embodiments can be combined. Lastly, the use of a singular term, such as, but not limited to, "a" is not intended as limiting of the number of items.

What is claimed is:

1. A method of data processing in a data processing system including a processor, the method comprising:
    the processor recording, in a lineage repository, dependence relationships between data objects;

the processor recording, in a classification repository, data classifications applicable to data objects, wherein the data classifications each indicate a respective class of sensitive data to which data protection is to be applied;

a processor, based on receiving a classification job requesting classification of a first data object, determines whether the lineage repository records a dependence relationship with a second data object;

based on determining that the lineage repository records a dependence relationship with the second data object, the processor associating in the classification repository at least a particular data classification applicable to the second data object with the first data object; and the processor applying data protection applicable to the particular data classification to the first data object.

2. The method of claim 1, wherein the second data object is derived from the first data object.

3. The method of claim 1, further comprising:

the processor storing, in a model statistics repository, cost metrics for a plurality of classification models, wherein each of the plurality of classification models is utilized to detect presence in data objects of sensitive data of at least one data classification; and based on determining that the lineage repository does not record a dependence relationship with the second data object:

the processor selecting multiple classification models to be applied to the data object and determining an order of application of the multiple classification models based on their associated cost metrics as indicated in the model statistic repository; and the processor processing data of the data object utilizing the multiple classifications models in the determined order.

4. The method of claim 3, further comprising:

the processor terminating the processing of the data of the data object utilizing the multiple classification models early prior to completion of processing of all of the data of the data object with all of the multiple classification models based on detecting presence of sufficient sensitive data in the data object to classify the data object.

5. The method of claim 3, further comprising:

detecting that cost metrics for a given classification model are not available in the model statistics repository; and determining cost metrics for the given classification model based on a subset of data from the data object; and recording cost metrics for the given classification model in the model statistics repository.

6. The method of claim 1, wherein:

the classification job requests classification of multiple data objects including the first data object; and the method further includes ordering the multiple data objects for classification processing based on dependence relationships between the multiple data objects as recorded in the lineage repository.

7. A program product, comprising:

a storage device; and program code stored within the storage device and executable by processing circuitry of a data processing system to cause the data processing system to perform:

recording, in a lineage repository, dependence relationships between data objects;

recording, in a classification repository, data classifications applicable to data objects, wherein the data classifications each indicate a respective class of sensitive data to which data protection is to be applied;

based on receiving a classification job requesting classification of a first data object, determines whether the lineage repository records a dependence relationship with a second data object;

based on determining that the lineage repository records a dependence relationship with the second data object, associating in the classification repository at least a particular data classification applicable to the second data object with the first data object; and applying data protection applicable to the particular data classification to the first data object.

8. The program product of claim 7, wherein the second data object is derived from the first data object.

9. The program product of claim 7, wherein the program code further causes the data processing system to perform:

storing, in a model statistics repository, cost metrics for a plurality of classification models, wherein each of the plurality of classification models is utilized to detect presence in data objects of sensitive data of at least one data classification; and based on determining that the lineage repository does not record a dependence relationship with the second data object:

selecting multiple classification models to be applied to the data object and determining an order of application of the multiple classification models based on their associated cost metrics as indicated in the model statistic repository; and processing data of the data object utilizing the multiple classifications models in the determined order.

10. The program product of claim 9, wherein the program code further causes the data processing system to perform:

terminating the processing of the data of the data object utilizing the multiple classification models early prior to completion of processing of all of the data of the data object with all of the multiple classification models based on detecting presence of sufficient sensitive data in the data object to classify the data object.

11. The program product of claim 9, wherein the program code further causes the data processing system to perform:

detecting that cost metrics for a given classification model are not available in the model statistics repository; and determining cost metrics for the given classification model based on a subset of data from the data object; and recording cost metrics for the given classification model in the model statistics repository.

12. The program product of claim 7, wherein:

the classification job requests classification of multiple data objects including the first data object; and the program code further causes the processing circuitry to perform:

ordering the multiple data objects for classification processing based on dependence relationships between the multiple data objects as recorded in the lineage repository.

13. A data processing system, comprising:

processing circuitry;

a storage device communicatively coupled to the processing circuitry; and program code stored within the storage device and executable by the processing circuitry of the data processing system to cause the data processing system to perform:

recording, in a lineage repository, dependence relationships between data objects;

recording, in a classification repository, data classifications applicable to data objects, wherein the data classifications each indicate a respective class of sensitive data to which data protection is to be applied;

based on receiving a classification job requesting classification of a first data object, determines whether the lineage repository records a dependence relationship with a second data object;

based on determining that the lineage repository records a dependence relationship with the second data object, associating in the classification repository at least a particular data classification applicable to the second data object with the first data object; and applying data protection applicable to the particular data classification to the first data object.

14. The data processing system of claim 13, wherein the second data object is derived from the first data object.

15. The data processing system of claim 13, wherein the program code further causes the data processing system to perform:

storing, in a model statistics repository, cost metrics for a plurality of classification models, wherein each of the plurality of classification models is utilized to detect presence in data objects of sensitive data of at least one data classification; and based on determining that the lineage repository does not record a dependence relationship with the second data object:

selecting multiple classification models to be applied to the data object and determining an order of application of the multiple classification models based on their associated cost metrics as indicated in the model statistic repository; and processing data of the data object utilizing the multiple classifications models in the determined order.

16. The data processing system of claim 15, wherein the program code further causes the data processing system to perform:

terminating the processing of the data of the data object utilizing the multiple classification models early prior to completion of processing of all of the data of the data object with all of the multiple classification models based on detecting presence of sufficient sensitive data in the data object to classify the data object.

17. The data processing system of claim 15, wherein the program code further causes the data processing system to perform:

detecting that cost metrics for a given classification model are not available in the model statistics repository; and determining cost metrics for the given classification model based on a subset of data from the data object; and recording cost metrics for the given classification model in the model statistics repository.

18. The data processing system of claim 13, wherein:

the classification job requests classification of multiple data objects including the first data object; and the program code further causes the processing circuitry to perform:

ordering the multiple data objects for classification processing based on dependence relationships between the multiple data objects as recorded in the lineage repository.

\* \* \* \* \*